United States Patent
Takeuchi et al.

(10) Patent No.: US 9,656,675 B2
(45) Date of Patent: May 23, 2017

(54) VEHICLE CONTROL SYSTEM

(75) Inventors: Keisuke Takeuchi, Susono (JP); Toshio Tanahashi, Susono (JP); Yoshimitsu Agata, Numadu (JP); Tomohide Kawasaki, Mishima (JP); Shin Noumura, Yamato (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/240,892

(22) PCT Filed: Aug. 29, 2011

(86) PCT No.: PCT/JP2011/069460
§ 371 (c)(1),
(2), (4) Date: May 22, 2014

(87) PCT Pub. No.: WO2013/030928
PCT Pub. Date: Mar. 7, 2013

(65) Prior Publication Data
US 2014/0257662 A1   Sep. 11, 2014

(51) Int. Cl.
*B60W 40/09* (2012.01)
*B60W 30/182* (2012.01)
(Continued)

(52) U.S. Cl.
CPC .......... *B60W 30/182* (2013.01); *B60W 40/09* (2013.01); *B60W 50/0098* (2013.01);
(Continued)

(58) Field of Classification Search
CPC ............. B60W 30/182; B60W 30/188; B60W 30/1882; B60W 40/09; B60W 40/105;
(Continued)

(56) References Cited

U.S. PATENT DOCUMENTS 7,908,065 B2   3/2011 Kuwahara et al.
8,521,338 B2 *  8/2013 Takeuchi et al. ............... 701/1
(Continued)

FOREIGN PATENT DOCUMENTS

JP   2005-113946   4/2005
JP   2008-101742   5/2008
(Continued)

OTHER PUBLICATIONS

Manfred Broy et al., Engineering Automotive Software, Proceedings of the IEEE, vol. 95, No. 2, Feb. 2007.*
(Continued)

*Primary Examiner* — Jerrah Edwards
(74) *Attorney, Agent, or Firm* — Finnegan, Henderson, Farabow, Garrett & Dunner, LLP (57) ABSTRACT

A vehicle control system for adjusting control characteristics governing behaviors of a vehicle in accordance with a driving preference of a driver. The vehicle control system is comprised of a shifting means that shifts a driving mode of the vehicle between a first mode in which a driving force to be generated is moderated and a second mode in which a driving force to be generated is larger than that generated under the first mode, upon exceedance of a predetermined threshold value by an index that is changed according to a change in a behavior of the vehicle resulting from an accelerating or a decelerating operation executed by the driver. The threshold value is set to a limit value of acceleration for human beings to sense a linear change in the acceleration from zero.

11 Claims, 8 Drawing Sheets

(51) Int. Cl.
*B60W 50/00* (2006.01)
*B60W 50/10* (2012.01)

(52) U.S. Cl.
CPC ..... *B60W 50/10* (2013.01); *B60W 2050/0083* (2013.01); *B60W 2540/30* (2013.01)

(58) Field of Classification Search
CPC ............. B60W 40/107; B60W 40/109; B60W 50/0098; B60W 50/08; B60W 50/082; B60W 50/085; B60W 50/087; B60W 50/10; B60W 50/12; B60W 2050/0029; B60W 2050/0083; B60W 2050/0095; B60W 2050/0096; B60W 2510/0604; B60W 2510/0609; B60W 2510/0652; B60W 2510/082; B60W 2510/205; B60W 2510/227; B60W 2520/105; B60W 2520/125; B60W 2540/00; B60W 2540/10; B60W 2540/103; B60W 2540/106; B60W 2540/18; B60W 2540/30; B60W 2600/00; B60W 2710/1038; B60W 2710/1044; B60W 2710/105; B60W 2710/1055; B60W 2710/1061; B60W 2900/00; B62D 6/007; F16H 2059/003; F16H 2059/082; F16H 2059/083; F16H 2059/084; F16H 2059/085; F16H 2059/086; F16H 2059/087; F16H 2061/0012; F16H 2061/0015; F16H 2061/0018; F16H 2061/0093; F16H 2061/0227

See application file for complete search history.

(56) References Cited

U.S. PATENT DOCUMENTS

| | | |
|---|---|---|
| 2008/0097674 A1 | 4/2008 | Kuwahara et al. |
| 2008/0215208 A1* | 9/2008 | Carlson .................. G07C 5/085 |
| | | 701/33.4 |
| 2012/0136506 A1 | 5/2012 | Takeuchi et al. |
| 2012/0143399 A1 | 6/2012 | Noumura et al. |

FOREIGN PATENT DOCUMENTS

| | | |
|---|---|---|
| JP | 2011-207466 A | 10/2011 |
| WO | WO 2011/021088 A1 | 2/2011 |
| WO | WO 2011/021634 A1 | 2/2011 |

OTHER PUBLICATIONS

Robert Charette, This Car Runs on Code, IEEE Spectrum Online, posted Feb. 1, 2009 at 5:00 GMT, http://spectrum.ieee.org/transportation/systems/this-car-runs-on-code.*

* cited by examiner

VEHICLE CONTROL SYSTEM

CROSS-REFERENCE TO RELATED APPLICATIONS

This application is a national phase application of International Application No. PCT/JP2011/069460, filed Aug. 29, 2011, the content of which is incorporated herein by reference.

TECHNICAL FIELD

The present invention relates to a control system for a vehicle, which is configured to control characteristics of a driving force, steering etc. according to driver's preference or intention.

BACKGROUND ART

A power performance of the vehicle is governed by a relations among a drive demand such as an opening degree of accelerator, an output amount such as an opening degree of a throttle valve, and a speed ratio. Meanwhile, steering characteristic is governed mainly by an assisting amount of steering angle or steering force. In turn, suspension characteristic is governed by e.g., a damping force of a shock absorber. A behavior of the vehicle is substantially governed by those factors, however, required performance for the vehicle differs depending on driver's preference or intention, road congestion, kind of road such as local road, highway etc. Therefore, control systems configured to select a driving mode out of plurality of modes have been developed. According to the conventional control systems of this kind, a speed change diagram, a second-order characteristic of a throttle opening, a damping force of a shock absorber, a vehicle height achieved by a suspension etc. can be changed depending on driver's choice or preference, by selecting the driving mode.

For example, Japanese Patent Laid-Open No. 2008401742 discloses a control apparatus configured to change conditions for changing a speed ratio in a manner to achieve sporty running, in case degree of quickness required by the driver calculated based on acceleration, opening degree of accelerator, brake pedal force etc. is greater than a threshold value (that is, in case a counter value is greater than a threshold value). According to the teachings of Japanese Patent Laid-Open No. 2008401742, therefore, a vehicle behavior required by the driver can be achieved without selecting the driving mode by the driver.

Meanwhile, PCT international publication WO2011/021634 discloses a vehicle control system configured to control characteristics of driving force, speed ratio, suspension etc. based on a command index representing driving preference of the driver that is obtained based on a synthesized acceleration of the longitudinal acceleration and lateral acceleration.

As described, according to the teachings of Japanese Patent Laid-Open No. 2008401742, the conditions for changing the speed ratio is changed in case the degree of quickness calculated as a counter value becomes greater than the threshold value. This means that the sporty running mode will not be established until the degree of quickness exceeds the threshold value. Therefore, the vehicle may not be driven in accordance with the driver's intention. If such threshold value is set to a larger value, the driving mode will not be shifted to the sporty mode promptly. In this case, therefore, a driving performance required by the driver may not be achieved. To the contrary, if the threshold value is set to a relatively smaller value, the driving mode may be shifted to the sporty mode unintentionally by a temporal acceleration or deceleration carried out to stay coordinated with the other vehicles or traffic condition. This may give driver a feeling of strangeness about a driving performance.

DISCLOSURE OF THE INVENTION

The present invention has been conceived noting the technical problems thus far described, and its object is to provide a vehicle control system configured to adjust a driving performance of the vehicle in a manner to enhance agility of the vehicle as required by the driver, without enhancing the agility excessively and without carrying out the adjustment frequently.

In order to achieve the above-mentioned object, according to the present invention, there is provided a vehicle control system that is configured to adjust control characteristics governing behaviors of a vehicle in accordance with a driving preference of a driver. The vehicle control system is comprised of a shifting means that shifts a driving mode of the vehicle between a first mode in which a driving force to be generated is moderated and a second mode in which a driving force to be generated is larger than that generated under the first mode, upon exceedance of a predetermined threshold value by an index that is changed according to a change in a behavior of the vehicle resulting from an accelerating or a decelerating operation executed by the driver. According to the present invention, the threshold value is set to a limit value of acceleration for human beings to sense a linear change in the acceleration from zero.

Specifically, the limit value includes an upper limit value of the acceleration for human beings to sense a fact that the acceleration is increased linearly from zero, and a lower limit value of the acceleration for human beings to sense a fact that the acceleration (i.e., a deceleration) is reduced linearly from zero.

The vehicle control system is configured to adjust the control characteristics in a manner to enhance agility of behaviors of the vehicle in accordance with an increase in a value of the index.

The index is a square root of a sum of squares of a longitudinal acceleration and a lateral acceleration of the vehicle, and the threshold value is set to a value within a range of 3.5 m/s$^2$ to 4.5 m/s$^2$.

The shifting means is configured to complete a shifting operation between the first mode and the second mode within a preset time from a point when a value of the index is changed across the threshold value, that allows the human beings to perceive a completion of the shifting operation between the first mode and the second mode. Specifically, the preset time is determined based on a human information processor model, and for example, the preset time is set to be shorter than 500 milliseconds.

Thus, according to the present invention, the index is changed according to a change in a behavior of the vehicle resulting from an accelerating or a decelerating operation executed by the driver. When the index is increased to exceed the threshold value, the driving mode is shifted from the first mode in which a driving force to be generated is moderated to the second mode in which a driving force to be generated is larger. By contrast, when the index is lowered to be smaller than the threshold value, the driving mode is shifted from the second mode to the first mode. Specifically, the threshold value is set in a manner such that the control characteristics are adjusted to establish the acceleration of the limit value for human beings to sense a fact that the acceleration is increased linearly from zero. Therefore, the acceleration is continuously changed in accordance with the index changed by an accelerating or a decelerating operation of the driver. When the acceleration reaches the limit value, the driving mode is shifted, and a zero point at which the human beings start sensing a change in the acceleration is reset. Then, the acceleration is further changed continuously. For this reason, the acceleration will not be changed insufficiently and excessively against the driver's intention. Consequently, the drivability is improved.

In addition, the shifting operation of the driving mode is completed within the preset time that allows the human beings to perceive a completion of the shifting operation. To this end, the preset time is determined based on an information processing cycle time required for an ordinary person to perceive a completion of the operation. Therefore, the acceleration is allowed to be changed continuously to reduce a gap between the continuity of the operation and the continuity of the change in the behaviors of the vehicle. For this reason, the drivability can be improved.

BEST MODE FOR CARRYING OUT THE INVENTION

Figure 6:
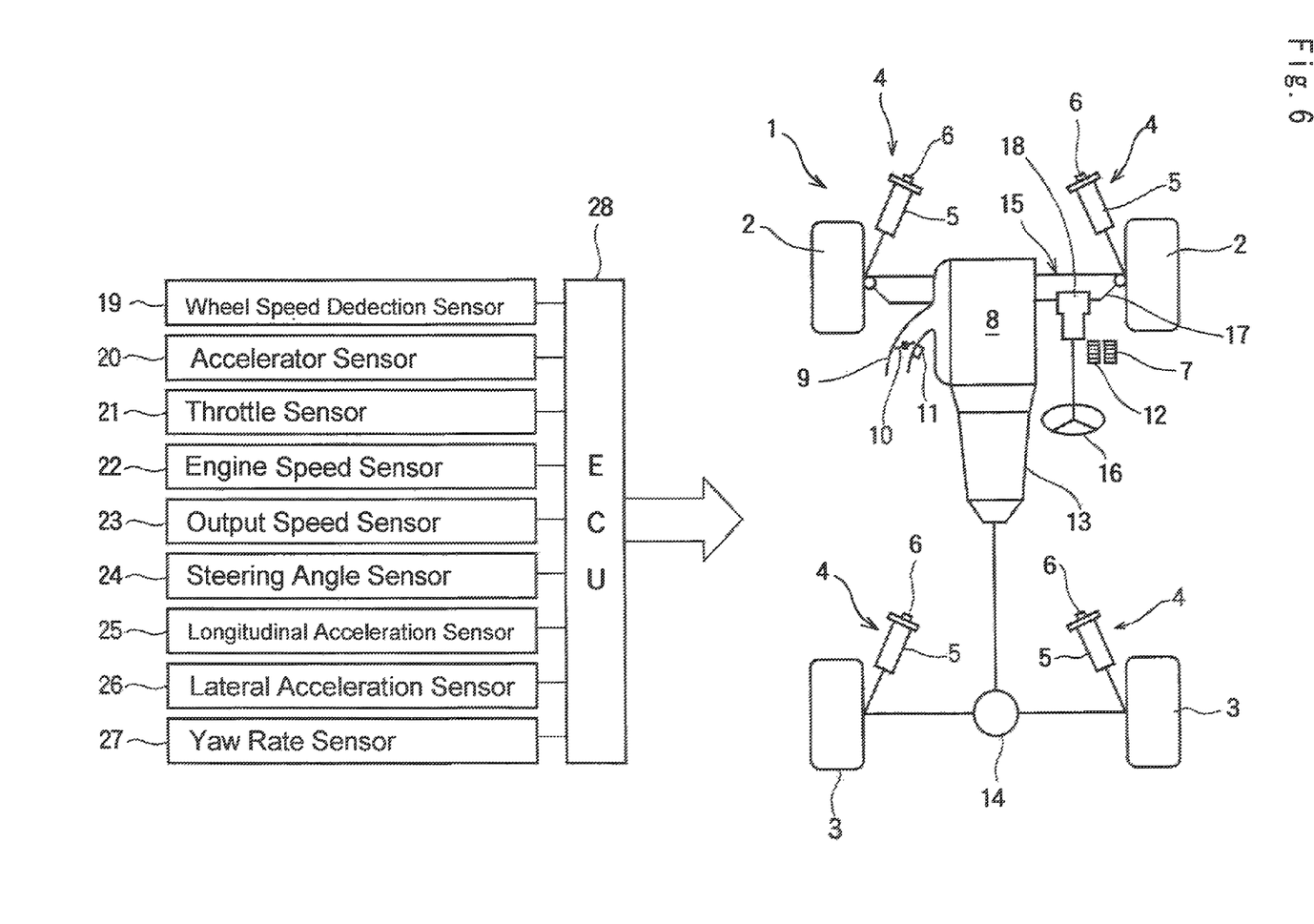
FIG. 6 is a view schematically showing a vehicle to which the present invention is applied.

Next, the vehicle control system of the present invention will be explained in more detail. The vehicle control system is applied to a vehicle using an engine or a motor as a prime mover whose speed and travelling direction is controlled by manipulating predetermined devices by the driver. FIG. 6 is a block diagram showing an example of the vehicle. As shown in FIG. 6, a vehicle 1 is provided with a pair of front wheels 2 and a pair of rear wheels 3. Specifically, each of the front wheel 2 serve as a steering wheel, and each of the rear wheel 3 serves as a driving wheel. Those wheels 2 and 3 are individually attached to a not shown vehicle body via a suspension 4. The suspension 4 is a conventional suspension device comprised of a not shown spring and a shock absorber (i.e., a damper) 5. The shock absorber 5 shown in FIG. 6 is configured to absorb a shock utilizing a flow resistance of air or liquid, and the flow resistance therein can be increased and decreased by a motor 6 functioning as an actuator. For example, in case of increasing the flow resistance in the shock absorber 5, a hardness of the suspension 4 in enhanced so that the vehicle 1 becomes difficult to be depressed. As a result, the drive feeling of the vehicle 1 becomes much sporty rather than comfortable. In addition, a height of the vehicle 1 can be adjusted by adjusting pressurized air in the shock absorber 5

Although not especially shown in FIG. 6, the front and rear wheels 2 and 3 are provided individually with a brake mechanism. Those brake mechanisms are actuated to apply braking force to the wheels 2 and 3 by depressing a brake pedal 7 arranged in a driver seat.

A conventional internal combustion engine, a motor, a combination of the engine and the motor and so on may be used as a prime mover of the vehicle 1, and in the example shown in FIG. 6, an internal combustion engine 8 is used as the prime mover. As shown in FIG. 6, a throttle valve 10 for controlling air intake is arranged in an intake pipe 9 of the engine 8. Specifically, the throttle valve 10 is an electronic throttle valve that is opened and closed by an actuator 11 such as a motor controlled electrically. The actuator 11 is actuated in accordance with a depression of an accelerator pedal 12 arranged in the driver seat, that is, in accordance with an opening degree of an accelerator, thereby adjusting an opening degree of the throttle valve 10 to a desired angle.

A relation between an opening degree of the accelerator as a depression of the accelerator pedal 12 and an opening degree of the throttle valve 10 may be adjusted arbitrarily, and if a ratio of the opening degree of the accelerator to the opening degree of the throttle valve is approximately one to one, the throttle valve 10 reacts directly to the operation of the accelerator so that the sportiness of the vehicle 1 is enhanced. To the contrary, in case of reducing the opening degree of the throttle valve 10 relatively with respect to the opening degree of the accelerator, behavior or acceleration of the vehicle 1 is moderated. In case of using the motor as the prime mover, a current control device such as an inverter or a converter is used instead of the throttle valve 10. In this case, a relation between the opening degree of the accelerator and a current value, that is, the behavior or acceleration of the vehicle 1 is changed arbitrarily by adjusting the current in accordance with the opening degree of the accelerator by the current control device.

According to the example shown in FIG. 6, a transmission 13 is connected with an output side of the engine 8. The transmission 13 is adapted to change a speed change ratio between an input speed and an output speed arbitrarily. For example, a conventional automatic geared transmission, a belt-driven continuously variable transmission, a toroidal transmission may be used in the vehicle 1. Specifically, the transmission 13 is provided with a not shown actuator, and adapted to change the speed ratio thereof stepwise or continuously by controlling the actuator. Basically, the transmission 13 is controlled in a manner to optimize the speed ratio to improve fuel economy. To this end, a speed change map for determining the speed ratio according to a speed of the vehicle 1 and the opening degree of the accelerator is preinstalled, and the speed change operation of the transmission 13 is carried out with reference to the map. Alternatively, the speed ratio of the transmission 13 can also be optimized by calculating a target output on the basis of the speed of the vehicle 1 and the opening degree of the accelerator, calculating a target engine speed on the basis of the calculated target output and an optimum fuel curve, and carrying out a speed change operation to achieve the obtained target engine speed.

In addition, a transmission mechanism such as a torque converter having a lockup clutch may be arranged between the engine 8 and the transmission 13 according to need. An output shaft of the transmission 13 is connected with the rear wheels 3 via a differential gear 14 serving as a final reducing mechanism.

Here will be explained a steering mechanism 15 for changing an orientation of the front wheels 2. The steering mechanism 15 is comprised of: a steering wheel 16; a steering linkage 17 adapted to transmit a rotation of the steering wheel 16 to the front wheels 2 and an assist mechanism 18 adapted to assist a steering angle or a steering force of the steering wheel 16. The assist mechanism 18 is provided with a not shown actuator, and adapted to control an assisting amount of the actuator. Therefore, a ratio of the steering angle of the steering wheel 16 to an actual steering angle of the front wheels 2 can be approximated to one to one by reducing the assisting force of the assist mechanism 18. As a result, the front wheels 2 can be turned directly in response to the rotation of the steering wheel 16 so that the sportiness of the vehicle 1 is enhanced.

Although not especially shown, in order to stabilize a behavior and attitude of the vehicle 1, the vehicle 1 is further provided with an antilock brake system (abbreviated as ABS), a traction control system, and a vehicle stability control system (abbreviated as VSC) for controlling those systems integrally. Those systems are known in the art, and adapted to stabilize the behavior of the vehicle 1 by preventing a locking and slippage of the wheels 2 and 3. For this purpose, those systems are configured to control a braking force applied to the wheels 2 and 3 on the basis of a deviation between a vehicle speed and a wheel speed while controlling the engine torque. In addition, a navigation system for obtaining data on road information and a contemplated route (i.e., data on driving environment), and a mode selecting switch for selecting a drive mode manually from a sporty mode, a normal mode, an energy saving mode (i.e., economy mode) and so on, may be arranged in the vehicle 1. Further, a 4-wheel-drive mechanism (4WD) adapted to change the driving characteristics such as a hill-climbing ability, acceleration, a turning ability and so on may also be arranged in the vehicle 1.

In order to obtain data for controlling the engine 8, the transmission 13, the shock absorber 5 of the suspension 4, the assist mechanism 18, and the above-explained not shown systems, various kinds of sensors are arranged in the vehicle 1. For example, a wheel speed detection sensor 19 adapted to detect a rotational speed of each wheel 2 and 3, an accelerator sensor 20 adapted to detect an opening degree of the accelerator, a throttle sensor 21 adapted to detect an opening degree of the throttle valve 10, an engine speed sensor 22 adapted to detect a speed of the engine 8, an output speed sensor 23 adapted to detect an output speed of the transmission 13, a steering angle sensor 24, a longitudinal acceleration sensor 25 adapted to detect the longitudinal acceleration (Gx), a lateral acceleration sensor 26 adapted to detect the lateral (or transverse) acceleration (Gy), a yaw rate sensor 27 and so on are arranged in the vehicle 1. Here, acceleration sensors used in the above-explained behavior control systems such as the antilock brake system (ABS) and a vehicle stability control system (VSC) may be used as the acceleration sensors 25 and 26, and if an air-bag is arranged in the vehicle 1, acceleration sensors for controlling an actuation of the air-bag may also be used as the acceleration sensors 25 and 26. Detection signals (i.e., data) of those sensors 19 to 27 are transmitted to an electronic control unit (abbreviated as ECU) 28. The ECU 28 is configured to carry out a calculation on the basis of the data inputted thereto and data and programs stored in advance, and to output a calculation result to the above-explained systems or the actuators thereof in the form of a control command signal.

Here will be explained a driving "mode" according to the present invention. Specifically, the driving "mode" is a mode for controlling a vehicle behavior. For example, under the normal mode, fuel economy, quietness, acceleration are moderately adjusted. In turn, under the sporty mode, driving performance such as agility and acceleration are enhanced in comparison with those under the normal mode. In contrast, under the economy mode, fuel economy is enhanced. In order to establish the above-explained driving modes, a relation between an opening degree of the accelerator and an opening degree of the throttle valve 10 (or output of the prime mover) or a speed of the engine 8 (i.e., output characteristic), a relation between a vehicle, speed or an opening degree of the accelerator and speed ratio (i.e., speed change characteristic), a relation between a vehicle speed or a steering angle and a steering assist amount (i.e., steering characteristic), and a relation between a height of the vehicle achieved by the suspension 4 and a damping force of the shock absorber 5 (i.e., a suspension characteristic), are adjusted under each driving mode. For example, under the sporty mode, the agility of the vehicle is enhanced. To this end, under the sporty mode, an output of the engine 8 is increased, a speed ratio is increased to increase a speed of the engine 8, a steering assist amount is reduced to enhance direct steering feeling, a damping force of the of the shock absorber 5 is increased to prevent depression of the vehicle body, and a suspension 4 is adjusted to lower the vehicle height. In contrast, under the economy mode, the characteristics to control the opening degree of the throttle valve 10 and the speed ratio are adjusted in a manner to enhance the fuel economy, the suspension characteristic is moderated to absorb vibrations of the vehicle body, and the steering assist amount is increased. In turn, under the normal mode, those characteristics are adjusted in a manner to moderate the vehicle behavior between the behavior under the sporty mode and the behavior under the economy mode.

According to the present invention, the vehicle control system is configured to correct the control characteristics and to alter the driving mode in accordance with an index calculated on the basis of a behavior of the vehicle. According to the present invention, the index representing a driving preference or disposition (or intension) of a driver may be employed for the above-explained purposes. For example, a predetermined calculation value of acceleration or corrected acceleration, a predetermined calculation value calculated based on an opening degree or an operating speed of the accelerator, and a calculation value of a steering angle or a steering speed may be used as the index. Specifically, a command sportiness index (abbreviated as command SPI hereinafter) disclosed in above-explained PCT international publication WO2011/021634 is used in the present invention. Hereinafter, the command SPI will be explained in more detail.

Specifically, the command SPI is calculated based on a synthesized acceleration of a longitudinal acceleration and a lateral acceleration. Such synthesized acceleration represents "sportiness in each moment", therefore, the synthesized acceleration is used as an "instant SPI (i.e., an instant sportiness index)". Specifically, the instant SPI can be calculated by the following formula:

$$\text{Instant SPI} = (Gx^2 + Gy^2)^{1/2}$$

where "Gx" is a longitudinal acceleration, and "Gy" is a lateral acceleration.

Preferably, at least one of positive acceleration and negative acceleration (i.e., deceleration) of the longitudinal acceleration Gx is normalized to be used in the above formula. In case of driving the vehicle, an actual negative acceleration is larger than an actual positive acceleration. However, the driver cannot sense such difference between the actual negative acceleration and the actual positive acceleration in most cases. That is, the driver is basically unable to recognize the difference between the actual negative acceleration and the actual positive acceleration. Therefore, in order to correct a gap between the actual acceleration value and the acceleration perceived by the driver, the longitudinal acceleration Gx may be normalized by increasing the detected or calculated value of the positive acceleration, or by reducing the detected or calculated value of the negative acceleration (i.e., deceleration). Specifically, such normalization may be carried out by obtaining a ratio between maximum detected or calculated values of the positive acceleration and the negative acceleration, and multiplying the obtained ratio by the detected or calculated value of the positive or negative acceleration. Alternatively, a detected or calculated value of the negative acceleration value of the lateral acceleration Gy is corrected. For example, a longitudinal driving force and a lateral force generated by a tire can be indicated in a friction circle. Likewise, those normalization or weighting is a process to maintain maximum accelerations in each direction within a circle of predetermined radius by weighting at least one of the positive and negative acceleration values. As a result of such normalization and weighting, an influence of the positive acceleration and an influence of the negative acceleration on the control to change the driving characteristics of the vehicle are differentiated.

Thus, a degree of the gap between the actual acceleration value and the acceleration sensed by the driver differs depending on the direction of the acceleration. For example, the degree of the gap between the actual acceleration value and the acceleration sensed by the driver in the yawing direction of the vehicle is different from that in the rolling direction of the vehicle. Therefore, according to the vehicle control system of the present invention, a degree to reflect the acceleration on the control to change the driving characteristics of the vehicle, in other words, a degree to change the driving characteristics of the vehicle according to the acceleration can be differentiated depending on the direction of the acceleration.

Figure 7:
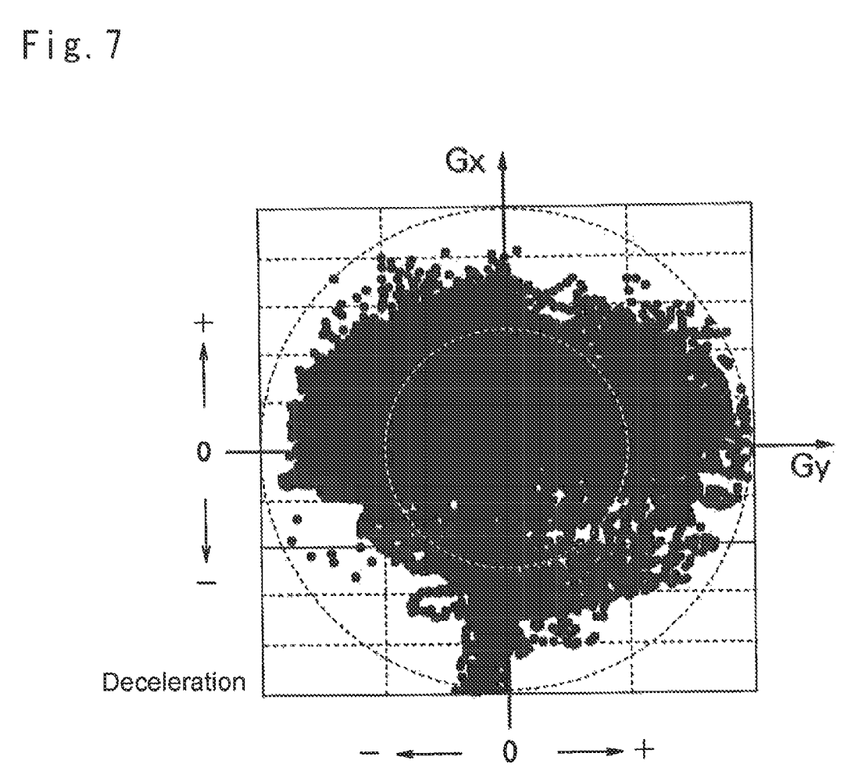
FIG. 7 is a friction circle plotting detected value of longitudinal acceleration and lateral acceleration.

FIG. 7 is a friction circle plotting sensor values of the lateral acceleration Gy and normalized values of the longitudinal acceleration Gx. Those values indicated in FIG. 7 were collected by driving the vehicle in a test course imitating ordinary roads. As can be seen from FIG. 7, the lateral acceleration Gy is not increased frequently in case of decelerating the vehicle significantly but the lateral acceleration Gy tends to be generated generally within the friction circle.

Figure 8:
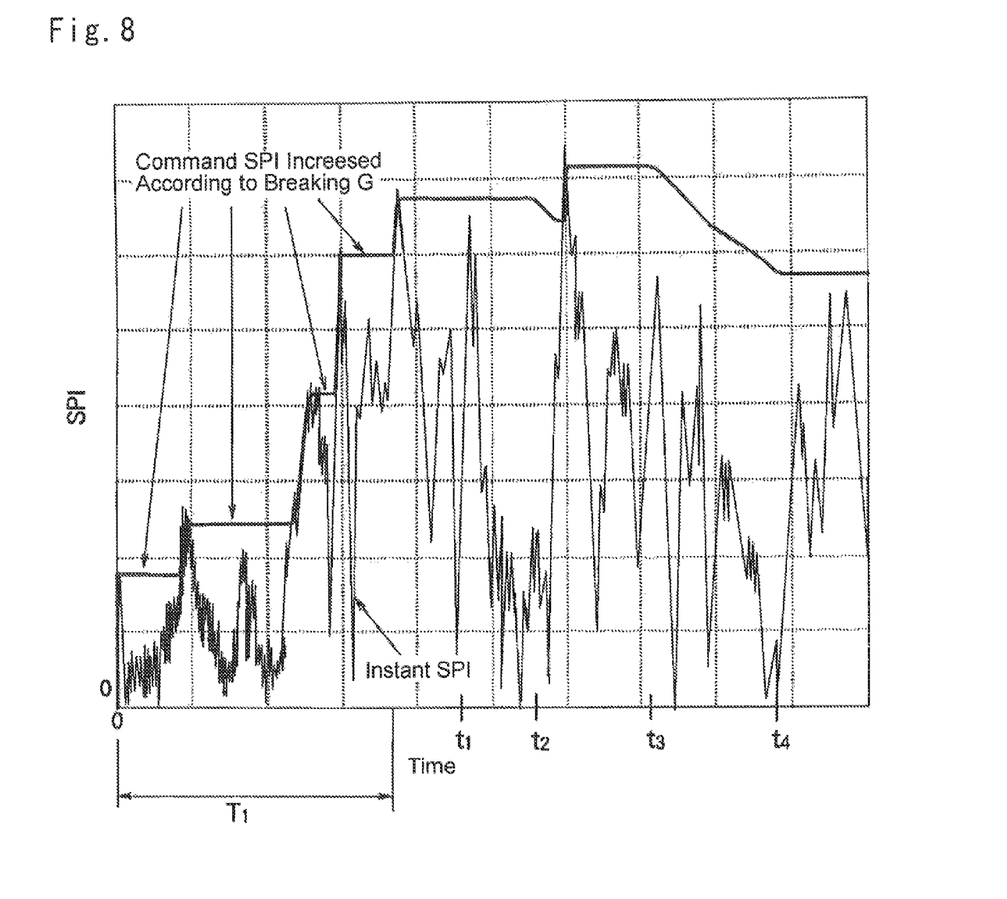
FIG. 8 is a graph indicating an example of a change in the command sportiness index according to a change in an instant SPI.

The command SPI to be used in the control for changing the driving characteristics of the vehicle is obtained based on the instant SPI thus calculated. The command SPI is increased immediately with an increase in the instant SPI, but lowered after a delay with respect to a drop in the instant SPI. Specifically, the command SPI is lowered based on a satisfaction of a specific condition. FIG. 8 is a graph indicating the command SPI being changed according to a fluctuation in the instant SPI changed by an abrupt braking (i.e., by braking G). Specifically the instant SPI shown in FIG. 8 corresponds to the plotted values indicated in FIG. 7. Meanwhile, the command SPI is set on the basis of a local maximum value of the instant SPI, and the command SPI is maintained until a satisfaction of a predetermined condition. Thus, the command SPI is increased promptly but lowered relatively slower.

As indicated in FIG. 8, during a period T1 from a commencement of the control, the instant SPI is fluctuated according to a change in the acceleration of the vehicle. Specifically, the instant SPI being fluctuated is increased locally to a maximum value prior to a satisfaction of the predetermined condition to update the command SPI. In this situation, the command SPI is set on the basis of each local maximum value of the instant SPI. Therefore, the command SPI is increased stepwise during the period T1. Then, when the condition to lower the command SPI is satisfied at a time point t2 or t3, the command SPI is started to be lowered. That is, the command SPI is lowered under the situation that maintaining the previous large value of the command SPI is undesirable. Specifically, according to the present invention, such condition to lower the command SPI is satisfied according to elapsed time.

More specifically, the above-mentioned condition in that "maintaining the previous large value of the command SPI is undesirable" is a situation in which a divergence between the command SPI being maintained to the current value and the current instant SPI is relatively large and such divergence between the indexes is being accumulated continuingly. For example, the command SPI will not be lowered even if the instant SPI is lowered instantaneously in case the accelerator pedal 12 is returned temporarily without intension to decelerate the vehicle by the driver's tendency. However, in case the instant SPI keeps fluctuating below the command SPI for a certain period of time, the aforementioned condition to lower the command SPI is satisfied. Thus, the length of time in which the instant SPI stays below the command SPI may be used as the condition to lower (or alter) the command SPI. In order to reflect the actual driving condition of the vehicle more accurately on the command SPI, a temporal integration (or accumulation) of the deviation between the command SPI being maintained and the instant SPI may be used as the condition to lower the command SPI. In this case, the command SPI is lowered when the temporal integration of the deviation between those indexes reaches a predetermined threshold value. To this end, this threshold value may be determined arbitrarily on the basis of a driving test or simulation. In case of using the temporal integration as the condition to lower the command SPI, the command SPI is to be lowered taking into consideration a duration time of the divergence of the instant SPI from the command SPI, in addition to the deviation between the command SPI and the instant SPI. In this case, therefore, the actual driving condition or behavior of the vehicle can be reflected on the control to change the driving characteristics of the vehicle more accurately.

In the example shown in FIG. 8, a length of time to maintain the command SPI before the time point t2 is longer than a length of time to maintain the command SPI before the time point t3. Those lengths of times to maintain the command SPI are determined by a control to be explained hereinafter. Specifically, as indicated in FIG. 8, the command SPI is increased to a predetermined value at the end of the aforementioned period T1 and maintained. In this situation, the instant SPI rises instantaneously at the time point t1 before the time point t2 at which the condition to lower the command SPI is to be satisfied. Therefore, an integral of the deviation between the command SPI and the instant SPI in this situation is smaller than a predetermined value, and the command SPI is maintained to the time point t2. Here, this predetermined value to lower the command SPI may be set arbitrarily on the basis of a driving test or simulation while taking into consideration a calculation error of the instant SPI. In case the instant SPI is thus raised close to the command SN, this means that the actual driving condition of the vehicle at this time point is similar to the accelerating and turning conditions represented by the instant SPI upon which the current command SPI being maintained is based. That is, although a certain period of time has elapsed from the time point at which the current command SPI being held was set, the actual driving condition of the vehicle is still similar to the condition at the time point when the current command SPI being maintained was set. Therefore, in this situation, a commencement to lower the command SPI is delayed even if the instant SPI is fluctuating below the current command SPI being maintained. For example, the commencement to lower the command SPI can be delayed by resetting the elapsed time (i.e., accumulation time) or the integral of deviation from the time point, at which the current command SPI out was set, and restarting the accumulation of the elapsed time or the integration of the deviation. Alternatively; the commencement to lower the command SPI may also be delayed by subtracting a predetermined value from the elapsed time of the command SPI or the integral of deviation between the command SPI and the instant SPI, or by interrupting the accumulation of the elapsed time or the integration of the deviation for a predetermined period of time.

Figure 9:
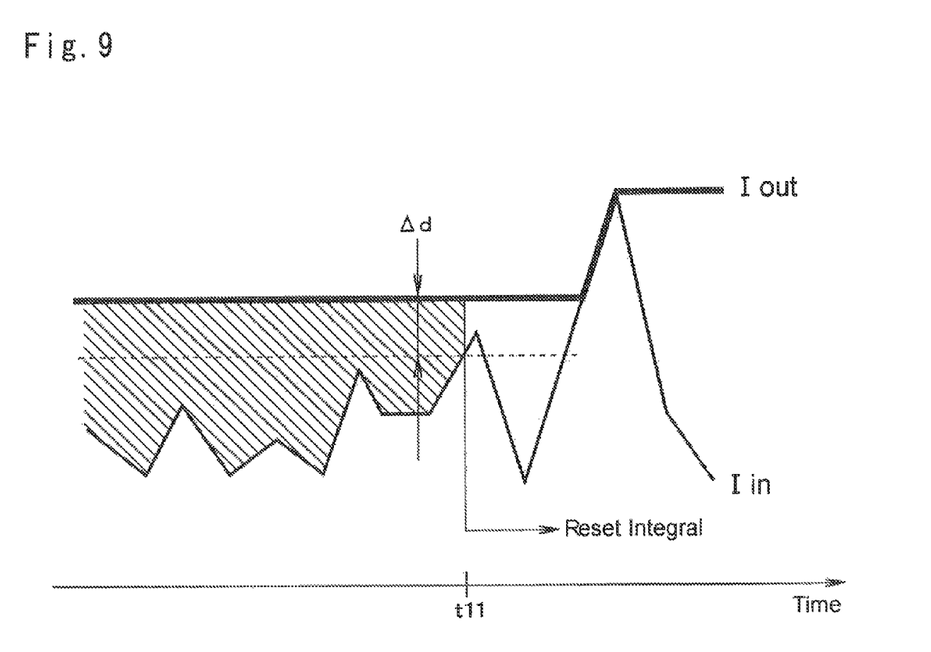
FIG. 9 is a graph indicating the integral of the deviation between the command SPI and the instant SPI, and a reset of the integral.

FIG. 9 is a graph indicating the aforementioned integral of the deviation between the command SPI and the instant SPI, and the reset of the integral. In FIG. 9, a shadowed area corresponds to the integral of the deviation between the command SPI and the instant SPI. In the example indicated in FIG. 9, the reset of the integral of the deviation is executed at a time point t11 at which the divergence between the command SPI and the instant SPI becomes smaller than a predetermined value Δd, and the integration of the deviation between the command SPI and the instant SPI is restarted from the time point t11. Consequently, the condition to lower the command the command SPI and the instant SPI is prevented from being satisfied at the time point dl so that the command SPI is maintained to the previous value. Then, when the instant SPI exceeds the command SPI after restarting the integration of the deviation therebetween, the command SPI is updated to the new local maximum value of the instant SPI and maintained.

Figure 1:
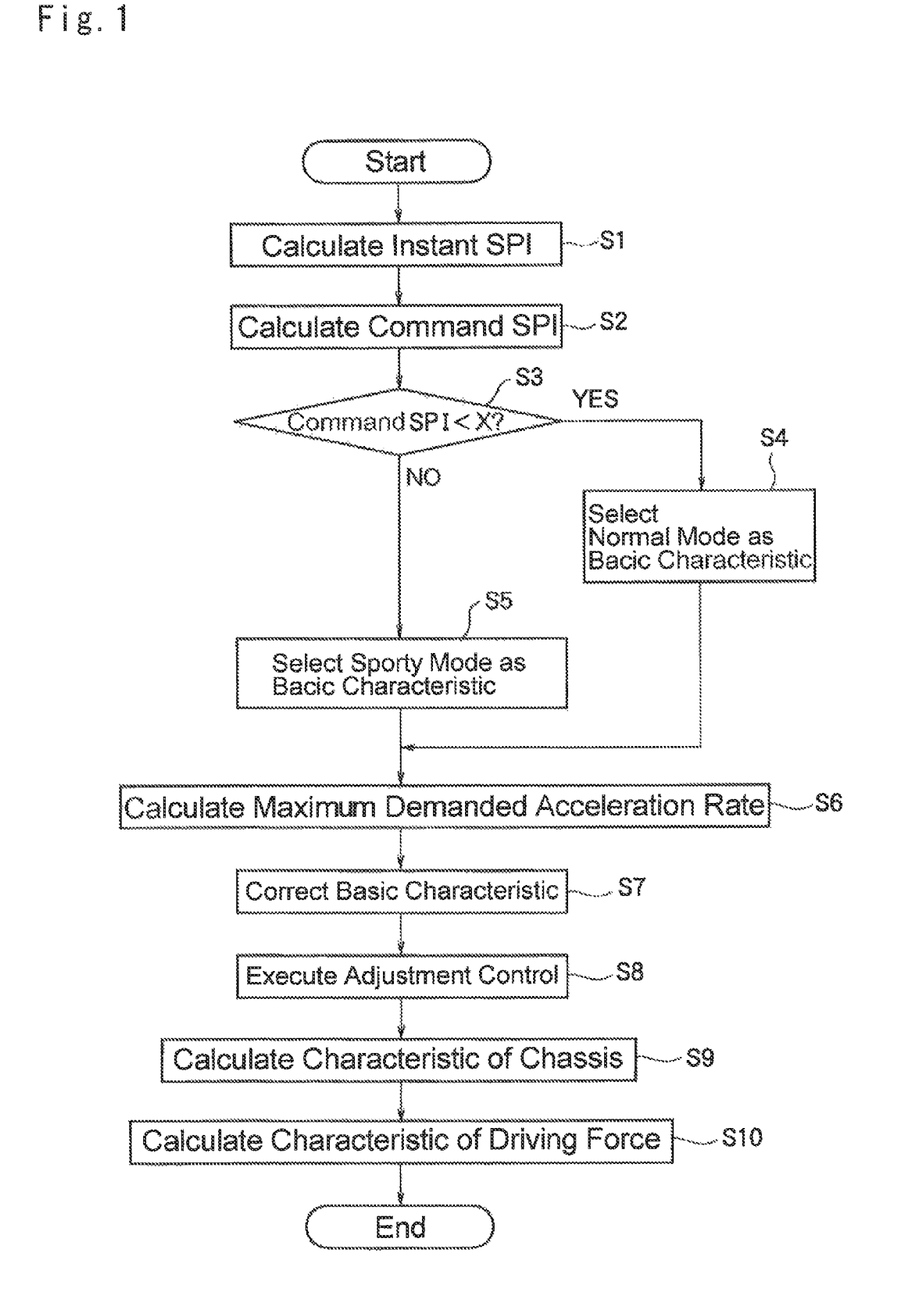
FIG. 1 is a flowchart explaining a control example to be carried out by the vehicle control system of the present invention.

Next, here will be explained a preferred control example to be carried out by the vehicle control system of the present invention using the above-explained command SPI. Referring now to FIG. 1, there is shown a flowchart for explaining a control example carried out under the condition that the present invention is applied to the vehicle in which the driving mode can be selected from the normal mode and the sporty mode. First of all, the instant SPI is calculated based on the current running condition or based on a detection value of the acceleration sensor (at step S1), and the command SPI is calculated based on the instant SPI thus calculated (at step S2). Those instant SPI and command SPI are calculated by the foregoing procedures. Then, it is determined whether or not the command SPI thus calculated is smaller than a predetermined threshold value X (at step S3). Specifically, the threshold X is a criterion to select the driving mode, and that is determined by the following procedures.

As described, the command SPI is an index representing driver's preference that is calculated based on the acceleration. That is, the command SPI is substantially an absolute value of the synthesized acceleration. Therefore, if the command SPI is set to large value, the characteristics of the output and the speed ratio etc. are adjusted in a manner such that the agility of the vehicle behavior is enhanced. For example, an opening degree of the throttle valve 10 or an output torque with respect to a predetermined opening degree of the accelerator is increased, and a speed ratio is increased to a low speed side (i.e., to a relatively large ratio) to increase the driving force. Thus, those characteristics are altered to enhance the sportiness of the vehicle behavior. Therefore, if the command SPI is increased, the acceleration of the vehicle is increased according to the drive demand such as an opening degree of the accelerator. Specifically, provided that the vehicle is an engine driven automobile, a control for increasing the minimum engine speed is carried out in order to thus increase the acceleration or generate a larger driving force. However, even if the acceleration is changed to comply with the driver's demand, the driver is able to sense a change in the acceleration linearly only within a predetermined range from the start of the change. If the acceleration is changed beyond the predetermined range, it would become difficult for the driver to sense a magnitude of acceleration. In this situation, therefore, it would be difficult for the driver to sense the change in the acceleration linearly from the beginning of the change in the acceleration. As a result, the driver may feel a gap between the actual accelerating operation and the sensed change in the acceleration. In addition, in case the vehicle speed is increased, an available acceleration to the maximum possible acceleration is rather small. In this case, therefore, it would be difficult to increase acceleration even if the accelerating operation is carried out.

Figure 2:
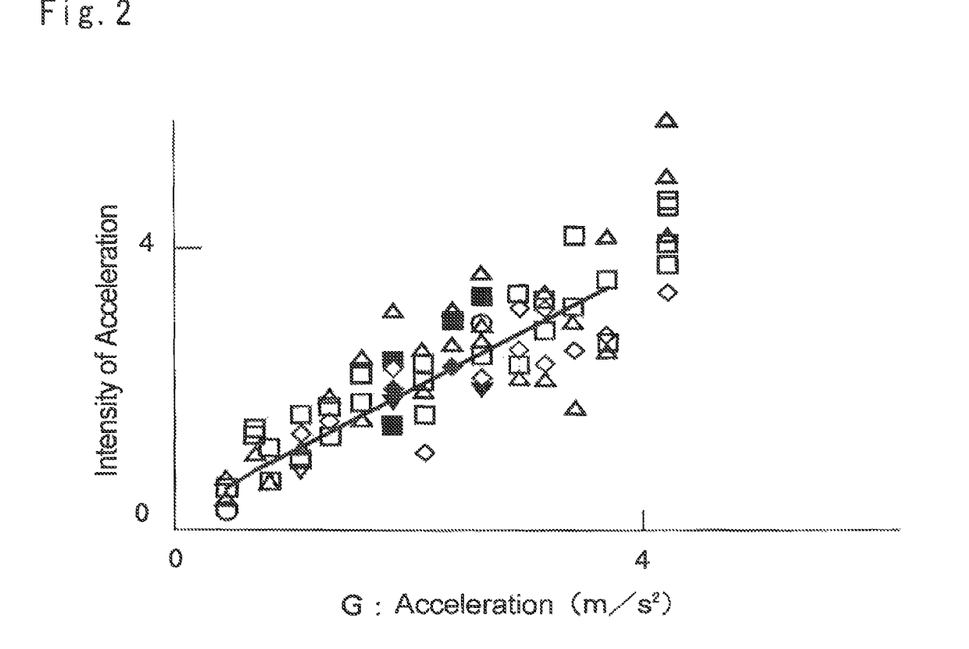
FIG. 2 is a graph showing an upper limit of acceleration at which human being can sense a linear change in the acceleration.

Referring now to FIG. 2, there is shown a measurement result of intensity of acceleration as stimuli perceived by the driver and passengers. In order to collect data shown in FIG. 2, the acceleration of the vehicle was increased gradually from zero, and the Weber fraction was set to "0.87". In FIG. 2, data of each passenger or driver is represented by different symbols. As can be seen from FIG. 2, a relation between the intensity and the stimulus became tenuous as an increase in the acceleration, and after the acceleration exceeded 4.5 m/s$^2$, most of the passengers or driver could not sense an increase in the acceleration as the stimulus. That is, if the command SPI requires a magnitude of acceleration greater than 4.5 m/s$^2$, the driver would not be able to sense a change in the acceleration and to determine whether or not the current driving condition is an intended condition.

The above-explained threshold value X is a criterion for selecting the driving mode, that is, to shift the driving mode to the normal mode or to the sporty mode. In other words, the threshold value X is a criterion for determining a value of the command SPI. As described, the command SPI is obtained based on the synthesized acceleration, and the synthesized acceleration is increased if the longitudinal or the lateral acceleration is increased by any of a steering operation, accelerating operation and a braking operation, even if the operation is temporal. That is, the command SPI is increased when the steering wheel, the accelerator pedal 12 or the brake pedal 7 is operated significantly even if such operation is not especially intended to enhance the agility (i.e., sportiness) of the vehicle, for example, even if such operation is carried out to dodge an obstacle, or carried out due to negligence. Therefore, if the threshold value X as a criterion of the command SPI is too small, a determination to shift to the sporty mode would be satisfied easily. Consequently, the driving mode of the vehicle would be shifted to the sporty mode frequently against the driver's intention. In order to avoid such a disadvantage, it is preferable to set the threshold value X within a predetermined range smaller than 4.5 m/s$^2$. Meanwhile, a lower limit value of the threshold value X is determined in a manner such that the driving mode will not be shifted automatically to the sporty mode frequently. To this end, the lower limit value of the threshold value X is determined based on a result of experimentation or simulation. According to the present invention, the lower limit value of the threshold value X is set to 3.5 m/s$^2$. Accordingly, the "upper limit value of acceleration" of the present invention is a predetermined design value within a range of "3.5 m/s$^2$ to 4.5 m/s$^2$".

Referring back to FIG. 1, if a value of the command SPI is smaller than the threshold value X so that the answer of step S3 is YES, the normal mode is selected as a basic characteristic (at step S4). In contrast, if a value of the command SPI is larger than the threshold value X so that the answer of step S3 is NO, the sporty mode is selected as the basic characteristic (at step S5). Thus, when the command SPI is increased to exceed the threshold value X, the sporty mode is selected. Then, when the command SPI is lowered to be smaller than the threshold value X, the driving mode is shifted to the normal mode again. As described, those driving modes govern the driving characteristics or control characteristics of the vehicle. Specifically, under the normal mode, the vehicle is allowed to behave according to the behavior as designed or planned. Meanwhile, under the sporty mode, the agility of the vehicle is enhanced in comparison with that under the normal mode. Here, the agility under the normal mode of sports cars and grand touring cars is enhanced in comparison with that under the normal mode of family cars and luxury cars.

The control characteristics to be adjusted under each driving mode include an output characteristic of the engine 8, a speed change characteristic, a steering characteristic, a suspension characteristic and so on. With respect to the output characteristic, under the sporty mode, a relation between an opening degree of the accelerator and an opening degree of the throttle valve 10 or an injection quantity of the fuel is set to a proportional relation that can be expressed by a straight line or a substantially straight line. In contrast, under the normal mode, the relation between an opening degree of the accelerator and an opening degree of the throttle valve 10 or an injection quantity of the fuel is set to a relation that can be expressed by a quadratic curve. Therefore, under the sporty mode, the output of the engine 8 can be controlled sensitively in accordance with a change in the opening degree of the accelerator. In contrast, under the normal mode, a change in the output of the engine 8 with respect to a change in the opening degree of the accelerator is reduced within a region where the opening degree of the accelerator is small. With respect to the speed change characteristic, under the normal mode, a relatively large speed ratio is established even if the vehicle is running at a high speed, that is, the speed ratio is controlled in a manner such that the engine speed is increased. In contrast, under the normal mode, the speed ratio is reduced in comparison with that under the sporty mode, that is, the speed ratio is controlled in a manner such that the engine speed is lowered.

With respect to the steering characteristic, under the sporty mode, a steering assist amount is reduced to enhance the so-called "direct steering feel". In contrast, under the normal mode, the steering assist amount is increased in comparison with that under the sporty mode. In turn, with respect to the suspension characteristic, under the sporty mode, a damping force of the shock absorber is increased to reduce a rolling motion and a squat motion of the vehicle. In addition, the vehicle height is lowered. In contrast, under the normal mode, the damping force of the shock absorber is reduced to enhance shock absorbability. In addition, the vehicle height is raised.

Those control characteristics are preinstalled individually for the normal mode and the sporty mode so that the control characteristics is switched depending on the selected driving mode. Specifically, a control map or a control gain is altered. Alternatively, detected data or control data calculated based on the detected data is corrected, otherwise, a coefficient for the correction is changed.

Figure 3:
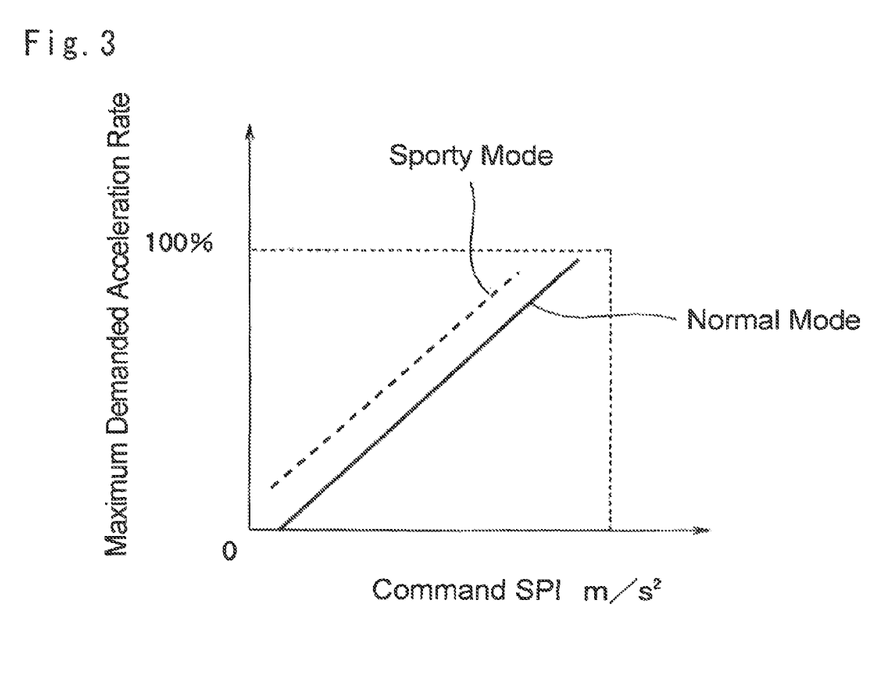
FIG. 3 is a map showing a relation between the command SPI and a maximum demanded acceleration rate.

After carrying out the control of step S4 or S5, or after calculating the command SPI, a maximum demanded acceleration rate is calculated (at step S6). An example to obtain the maximum demanded acceleration rate is shown in FIG. 3. Specifically, the maximum demanded acceleration rate represents an available driving force capacity of the vehicle. For example, in case the maximum demanded acceleration rate is 100%, the vehicle is in condition to produce maximum possible acceleration. In this situation, meanwhile, the transmission 13 is in condition to establish a speed ratio to raise the engine speed to the maximum speed, or to set the largest speed ratio (i.e., the speed ratio of the lowest speed side). In case the maximum demanded acceleration rate is 50%, the vehicle is in condition to produce half of available acceleration thereof, and the transmission 13 is in condition to establish an intermediate speed ratio. As indicated in the example shown in FIG. 3, the maximum demanded acceleration rate is increased according to an increase in the command SPI. In FIG. 3, basic characteristic of the vehicle is indicated by a solid line. The basic characteristic of the vehicle indicated in FIG. 3 was obtained by calculating a relation between the command SPI and the maximum demanded acceleration rate on the basis of data obtained from a driving test of the vehicle, while making appropriate modifications on the basis of the driving test and a simulation of driving the vehicle, in case of setting a characteristic line in a region where the maximum demanded acceleration rate is higher than the basic characteristics, the acceleration of the vehicle is increased relatively. In this case, therefore, the acceleration of the vehicle is increased so that the sportiness of the driving characteristics is enhanced. By contrast, in case of setting the characteristic line in a region where the maximum demanded acceleration rate is lower than the basic characteristics, the acceleration of the vehicle is decreased relatively. In this case, therefore, the driving characteristics and acceleration of the vehicle are moderated so that the riding comfort of the vehicle is improved.

Figure 4:
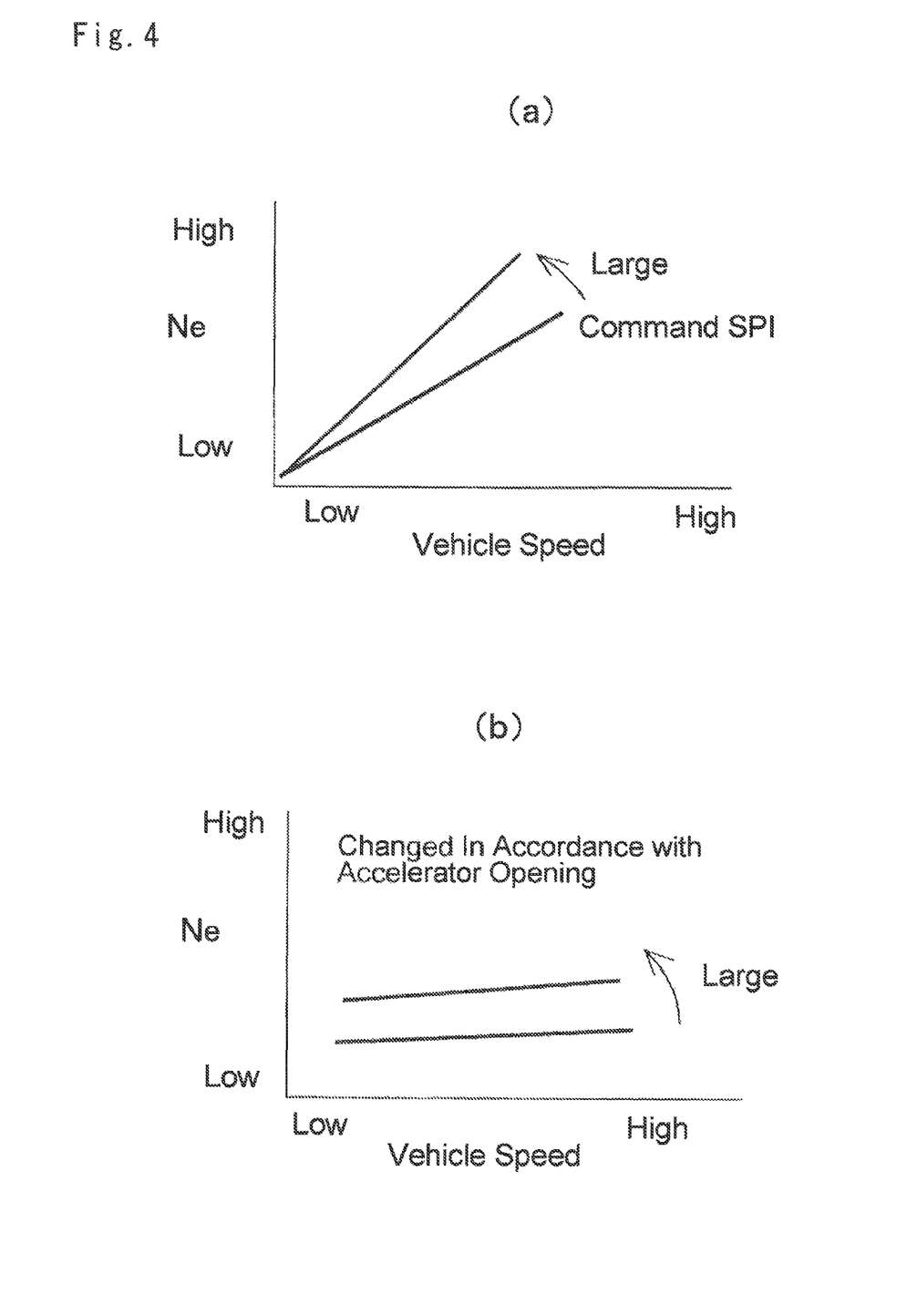
FIG. 4 shows examples of correcting an engine speed under the sporty mode and the normal mode.

Then, a calculation for correcting the basic characteristic is carried out (at step S7). Specifically, the control characteristic is corrected in accordance with the command SPI, the demanded driving force and so on within a range of each driving mode such as the normal mode and the sporty mode. For example, with respect to the speed change control, a speed ratio or a gear stage obtained with reference to the map for any of the driving mode is corrected to be shifted to a larger ratio or to a ratio of low speed side, in accordance with an increase in the command SPI or the opening degree of the accelerator. To this end, not only the speed ratio or the gear stage itself but also the data for calculating the speed ratio or the gear stage may be corrected. FIG. 4 shows examples of correcting an engine speed. FIG. 4 (*a*) shows an example of increasing the engine speed under the sporty mode in accordance with an increase in the command SPI, and FIG. 4(b) shows an example of increasing the engine speed under the normal mode in accordance with an increase in the opening degree of the accelerator.

Thus, according to the foregoing example, the following control amounts are used to control the vehicle, such as the control amount obtained based on the basic characteristic for the normal mode, the control amount obtained based on the basic characteristic for the sporty mode, and the control amounts obtained by correcting the basic characteristic for each driving mode. In some cases, a value of any one of those control amounts may be restricted by some kind of restricting factor to be smaller than values of other control amounts (i.e., to be a value to degrade agility of the vehicle). In order to avoid such a disadvantage, according to the control example shown in FIG. 1, an adjustment control is carried out (at step S8). At step S8, specifically, comparison is carried out among the above-explained control amounts, that is, among the control amount obtained based on the basic characteristic for the normal mode, the control amount obtained based on the basic characteristic for the sporty mode, and the control amounts obtained by correcting the basic characteristic for each driving mode. Then, one of those control amounts that is most appropriate to enhance the agility of the vehicle is selected. For example, a selection that is called a "Max selection" is carried out to select the largest speed ratio. Alternatively, in case of controlling the gear stage, a selection that is called a "Minimum selection" is carried out to select a lower gear stage. However, the foregoing control of step S8 is not absolutely necessary to be carried out.

Thus, the speed ratio or the gear stage is controlled in accordance with the basic characteristic or the corrected basic characteristic for each driving mode. After thus controlling the speed ratio or the gear stage, or simultaneously with controlling the speed ratio or the gear stage, a characteristic of chassis is calculated (at step S9), and a characteristic of driving force is calculated (at step S10). Specifically, those characteristics are changed in accordance with the calculation result by controlling the actuators for controlling characteristics of the throttle valve 10, the speed ratio of the transmission 13, the damping force of the shock absorber 5 of the suspension 4, the assisting force of the assist mechanism 18 and so on. Basically, those control characteristics are changed in a manner such that the agility of the vehicle is enhanced to achieve a sporty running, in accordance with an increase in the command SPI. Specifically, those characteristics are changed in a manner such that quick acceleration is achieved by generating a large driving force, that a depression or bounce of the vehicle body is reduced by sustaining the vehicle body firmly, and that the direct steering feeling is achieved by reducing the assisting amount of the steering operation. A basic characteristic of the chassis and a basic characteristic of the driving force are also preinstalled individually for each driving mode such as the normal mode and the sporty mode. Therefore, the assisting amount of the steering operation, the damping force of the shock absorber, and the opening degree of the throttle valve 10 with respect to the opening degree of the accelerator are individually controlled depending on the basic characteristic for the selected driving mode, and the control amounts thereof are individually corrected in accordance with the command SPI within the range of the basic characteristic.

As described, according to the foregoing control carried out by the vehicle control system of the present invention, the threshold value X is used to select the driving mode, and the driving mode is shifted when the command SPI is changed across the threshold value X. Specifically, the threshold value X is set to the maximum value of the acceleration at which a linear change in the acceleration from "0" can be sensed by human-beings, that is, to the value within a range from 3.5 m/s$^2$ to 4.5 m/s$^2$. Therefore, when the absolute value of the synthesized acceleration is increased to exceed the threshold value X provided that the vehicle is driven under the normal mode, the driving mode is shifted from the normal mode to the sporty mode, and the controls of the acceleration and so on are carried out in accordance with the basic characteristics for the sporty mode. In this situation, the acceleration is increased linearly to the maximum value at which the driver can sense a linear change thereof, and then the driving mode is shifted and the acceleration is increased again. That is, the acceleration is allowed to be increased from "0" again so that the driver is allowed to sense the linear change in the acceleration. Since the zero point of the acceleration is thus reset, the driver is allowed to sense a change in the vehicle behavior that is intended by the driver. Therefore, the drivability can be improved. Here, a definition of the expression "linear change in the acceleration" is that the acceleration is changed at a constant gradient, in other words, the acceleration is changed in a linear manner. Meanwhile, a definition of the expression "cannot sense a linear change in the acceleration" is that the acceleration is changed discontinuously even if the driver can sense such change in the acceleration, or that the gradient of the change in the acceleration is different from a prior gradient.

Thus, when the driving mode is shifted, the acceleration is not changed temporarily, and then started to be changed again after the driving mode is shifted. That is, the zero point of the change in the acceleration is reset and then the acceleration is changed again from "0". Therefore, the driver is allowed to sense the linear change in the acceleration. However, if it takes a long time to shift the driving mode, the driver also perceives an interruption of the change in the acceleration. Such interruption of the change in the acceleration may provide the driver with an uncomfortable feeling. In order to prevent the driver from feeling such an uncomfortable feeling, the shifting operation of the driving mode is completed within a preset time.

The preset time for shifting the driving mode is determined as explained hereinafter. According to the "human information processor model", a cognitive time of a completion of a certain task performed by a person having ordinary operative and perceptual competencies based on his/her will is a sum of: an actual time for performing the task by a hand or fingers; a time for sensing a fact that the task was performed; and a time for perceiving a fact that the task has been completed, or perceiving a result of the task. Specifically, the total of those times is approximately 250 to 500 milliseconds. That is, if the result of the task can be achieved within a range of the maximum cognitive time, the person whom performed the task is allowed to feel an expected feeling as a result of performing the task, without feeling any delay or frustration. According to the present invention, therefore, the shifting operation of the driving mode is completed within 500 milliseconds at the latest, preferably within 250 milliseconds from the time point at which the command SPI reaches the threshold value X. The predetermined time thus determined includes a control delay of the control system. For this reason, the driver is allowed to sense the linear change in the acceleration without interruption over the entire course of the linear change, before shifting the driving mode and after shifting the driving mode across the point of resetting the zero point at which the human beings start sensing the linear change in the acceleration. Therefore, the driver may not feel any uncomfortable feelings.

Figure 5:
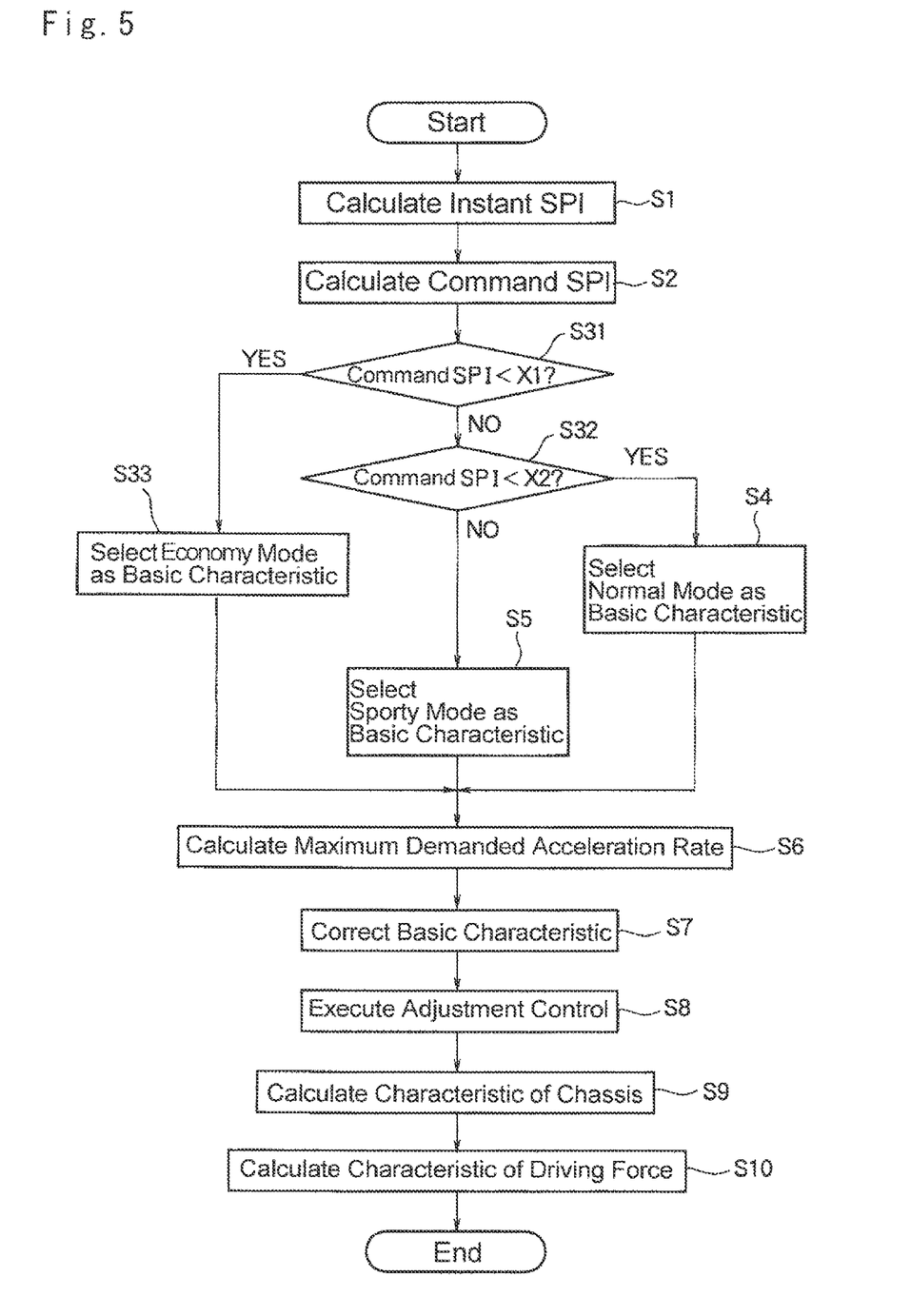
FIG. 5 is a flowchart explaining another control example to be carried out by the vehicle control system of the present invention.

As described, under the sporty mode, each control characteristic is adjusted in a manner such that the agility of the vehicle is enhanced. This means that the sporty mode is slightly inferior to the normal mode in the fuel economy. In order to avoid such a disadvantage, it is also possible to improve the fuel economy instead of improving the agility of the vehicle. Specifically, economy mode can be set to maintain the engine speed in a manner to optimize the fuel economy. Under the economy mode, the characteristics of chassis and driving force are also adjusted in accordance with the engine speed thus adjusted or the driving force generated by the engine. Referring now to FIG. 5, there is shown a flowchart for explaining an example for selecting the economy mode. Specifically, a threshold value X1 as a lower limit value of the command SPI and a threshold value X2 as an upper limit value of the command SPI are employed in the example shown in FIG. 5, and the driving mode is selected from the sporty mode, the normal mode and the economy mode on the basis of a comparison result of those threshold values X1 and X2.

As the example shown in FIG. 1, first of all, the instant SPI is calculated (at step S1), and the command SPI is calculated (at step S2). Then, it is determined whether or not the command SPI is smaller than the lower limit threshold value X1 (at step S31). The lower limit threshold value X1 is a minimum value of the acceleration that allows the driver in a normal driving posture to sense a change in the acceleration from zero, or a parameter such as an opening degree of the accelerator corresponding to said minimum value of the acceleration. For example, in case the vehicle is running at low speed in an urban area, such minimum value of the acceleration is within a range of 1.0 m/s$^2$ to 1.5 m/s$^2$. In addition, the lower limit threshold value X1 may be determined depending on a structure or grade of the vehicle. If the command SPI is larger than the lower limit threshold value X1 so that the answer of step S31 is NO, it is determined whether or not the command SPI is smaller than the upper limit threshold value X2 (>X1) (at step S32). The upper limit threshold value X2 is a maximum value of the acceleration that allows the driver having an ordinary sensitivity in a normal driving posture to sense a linear change in the acceleration from substantially zero, or a parameter such as an opening degree of the accelerator corresponding to said maximum value of the acceleration. Such maximum value of the acceleration is within a range of 3.5 m/s$^2$ to 4.5 m/s$^2$ irrespective of the vehicle speed. Accordingly; the upper limit threshold value X2 is determined based on an experimental result or the like, and depending on a structure or grade of the vehicle.

If the command SPI is smaller than the upper limit threshold value X2 so that the answer of step S32 is YES, the normal mode is selected as the basic characteristic (at step S4). By contrast, if the command SPI is larger than the upper limit threshold value X2 so that the answer of step S32 is NO, the sporty mode is selected as the basic characteristic (at step S5). That is, the controls similar to those of foregoing steps S4 and S5 shown in FIG. 1 are carried out.

Meanwhile, if the command SPI is smaller than the lower limit threshold value X1 so that the answer of step S31 is YES, the economy mode is selected as the basic characteristic (at step S33). As described, the controls for improving the fuel economy are carried out under the economy mode. To this end, under the economy mode, the driving force is reduced or changed in a mild manner; and in connection with such reduction in the driving force, the vehicle is basically driven with a smaller speed ratio. In addition, the damping force of the shock absorber is reduced, the vehicle height is raised, and the steering assist amount is increased. Here, such control characteristics are also preinstalled. After thus selecting or shifting the driving mode at any of steps S4, S5 and S33, the controls similar to those of steps S6 to S10 shown in FIG. 1 are to be carried out sequentially. Therefore, a detailed explanation for steps S6 to S10 is omitted.

Thus, according to the control example shown in FIG. 5, the driving mode can be selected from more options. Therefore, the driving performance of the vehicle may be selected arbitrarily depending on the driver or driving environment. For this reason, the drivability can be improved, and in addition, the fuel economy can also be improved.

The invention claimed is:

1. A vehicle control system, which is configured to adjust control characteristics governing behaviors of a vehicle in accordance with a driving preference of a driver, comprising:
a control unit programmed to:
calculate an index based on input from an engine speed sensor, a lateral acceleration sensor, and a longitudinal acceleration sensor, the index changing according to a change in a behavior of the vehicle resulting from an accelerating or a decelerating operation executed by the driver; and
shift a driving mode of the vehicle between a first mode in which a driving force to be generated is moderated and a second mode in which a driving force to be generated is larger than that generated under the first mode, upon exceedance of a predetermined threshold value by the index;
wherein the threshold value is set to a limit value of acceleration for human beings to sense a linear change in the acceleration from zero, and
wherein the driving mode is used to attenuate input signals received from the driver to perform at least one of: changing an opening degree of a throttle valve, modifying an absorption of a suspension, and changing a steering assist amount.

2. The vehicle control system as claimed in claim 1, wherein the threshold value is determined in a manner such that the control characteristics are adjusted to establish the acceleration of an upper limit value for human beings to sense a fact that the acceleration is increased linearly from zero under the first mode; and
wherein the driving mode is shifted from the first mode to the second mode upon exceedance of the threshold value by the index being increased.

3. The vehicle control system as claimed in claim 1, wherein the threshold value is determined in a manner such that the control characteristics are adjusted to establish the acceleration of a lower limit value for human beings to sense a fact that the acceleration is reduced linearly from zero under the second mode; and
wherein the driving mode is shifted from the second mode to the first mode upon reduction in the index below the threshold value.

4. The vehicle control system as claimed in claim 1, wherein the control characteristics are adjusted to enhance agility of behaviors of the vehicle in accordance with an increase in a value of the index.

5. The vehicle control system as claimed in claim 1, wherein the index includes a square root of a sum of squares of a longitudinal acceleration and a lateral acceleration of the vehicle; and wherein the threshold value is set to a value within a range of 3.5 m/s² to 4.5 m/s².

6. The vehicle control system as claimed in claim 1, wherein the shifting means is configured to complete a shifting operation between the first mode and the second mode within a preset time from a point when a value of the index is changed across the threshold value, that allows the human beings to perceive a completion of the shifting operation between the first mode and the second mode.

7. The vehicle control system as claimed in claim 6, wherein the preset time is determined based on a human information processor model.

8. The vehicle control system as claimed in claim 6, wherein the preset time is shorter than 500 milliseconds.

9. The vehicle control system as claimed in claim 6, wherein the preset time includes a control delay in a shifting operation between the first mode and the second mode.

10. The vehicle control system as claimed in claim 1, wherein the shifting means is configured to return the driving mode to the first mode again from the second mode, after the driving mode is shifted from the first mode to the second mode as a result of the exceedance of the threshold value by the index and the index is again lowered to be smaller than the threshold value.

11. An electronic control unit for use in a vehicle control system, which is configured to adjust control characteristics governing behaviors of a vehicle in accordance with a driving preference of a driver, the electronic control unit being programmed to perform operations comprising:

calculating an index based on input from an engine speed sensor, a lateral acceleration sensor, and a longitudinal acceleration sensor, the index changing according to a change in a behavior of the vehicle resulting from an accelerating or a decelerating operation executed by the driver; and shifting a driving mode of the vehicle between a first mode in which a driving force to be generated is moderated and a second mode in which a driving force to be generated is larger than that generated under the first mode, upon exceedance of a predetermined threshold value by the index;

wherein the threshold value is set to a limit value of acceleration for human beings to since a linear change in the acceleration from zero, and wherein the driving mode is used to attenuate input signals received from the driver to perform at least one of: changing an opening degree of a throttle valve, modifying an absorption of a suspension, and changing a steering assist amount.

* * * * *